United States Patent [19]

Schymick

[11] 4,330,052
[45] May 18, 1982

[54] COMBINED STOP AND LIMIT SWITCH

[76] Inventor: Michael J. Schymick, 5299 Hertford, Troy, Mich. 48084

[21] Appl. No.: 182,539

[22] Filed: Aug. 29, 1980

[51] Int. Cl.³ .................. F16D 71/04; H01H 3/16; B27G 23/00
[52] U.S. Cl. .................. 192/148; 33/165; 33/185 R; 192/143; 192/149; 200/47; 408/14
[58] Field of Search .............. 192/141, 143, 148, 149; 200/47, 153 T; 33/185 R, 165; 408/14, 16

[56] References Cited

U.S. PATENT DOCUMENTS

| | | | |
|---|---|---|---|
| 1,887,437 | 11/1932 | Schotthoefer | 33/185 R X |
| 2,353,471 | 7/1944 | Johndrew | 192/143 X |
| 2,817,725 | 12/1957 | Rochfort et al. | 200/47 |
| 2,909,082 | 10/1959 | Booth | 408/14 X |
| 3,190,009 | 6/1965 | Zagar | 33/166 |
| 3,667,651 | 6/1972 | Shapiro | 192/143 X |

FOREIGN PATENT DOCUMENTS 663408  4/1929  France .............. 192/141

*Primary Examiner*—Allan D. Herrmann
*Attorney, Agent, or Firm*—Cullen, Sloman, Cantor, Grauer, Scott & Rutherford

[57] ABSTRACT

A limit switch gauge positioner for a machine ram supporting a forming tool or the like. The ram, supported for reciprocal movement relative to a head, has a lineal distance gauging rod thereon formed with a plurality of longitudinally graduated reference indents. The rod has a body member slidable thereon including a detent coupling plunger adapted for engaging a selected one of the indents allowing an operator to initially locate the body member relative to the ram. A micrometer is supported on the body member with its spindle being settable at graduations along the spindle axis parallel to the path of travel of the ram. The head supports a housing including a microswitch with its actuator aligned on the spindle axis. An operating member is pivoted on the housing intermediate the switch actuator and spindle and gravitationally biases an arm section into arresting contact with the actuator in its extended switch closed position. The spindle engages and pivots the operating member, responsive to travel of the ram to initially depress the actuator de-energizing the ram drive source. The operating member has a gauged stop finger section which, upon subsequent ram travel provides positive engagement with the housing resulting in the ram being accurately located relative to a known pre-set micrometer graduation.

10 Claims, 5 Drawing Figures

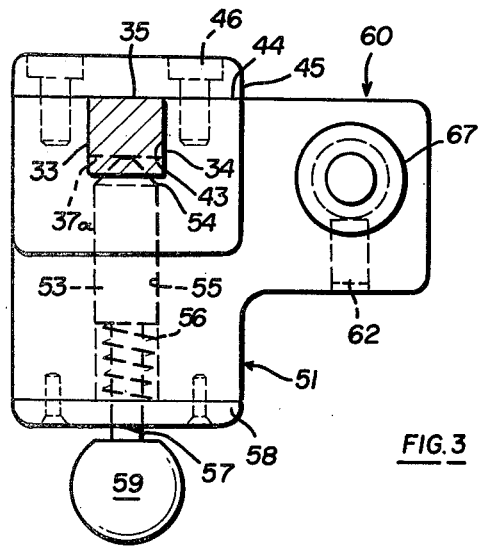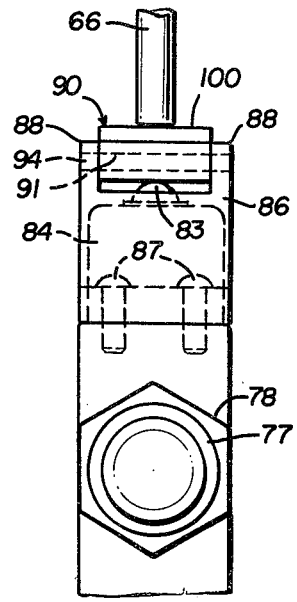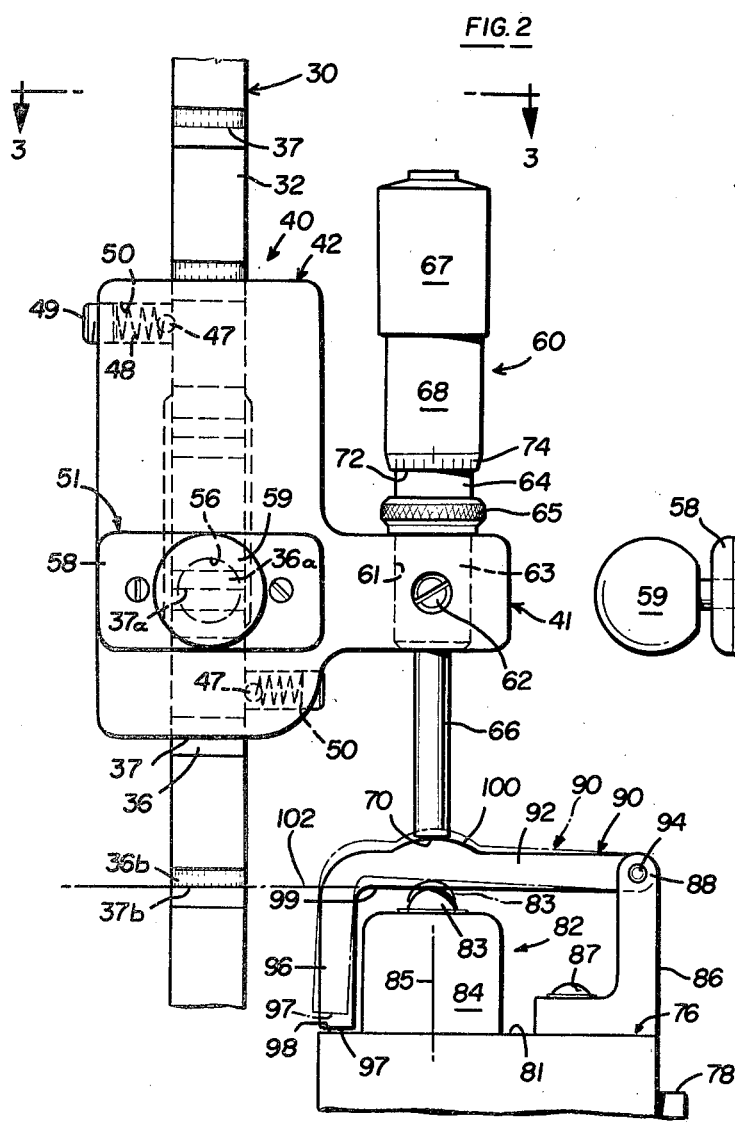

COMBINED STOP AND LIMIT SWITCH

BACKGROUND OF THE INVENTION

The present invention relates generally to a limit switch gauging apparatus and more particularly to a machine tool limit switch gauging positioner for carrying out various machine functions.

Various adjustable positive stop or micrometer stop devices have been employed in an effort to halt the movement of a machine tool at an exact location upon the completion of its forming operation. The present invention is particularly concerned with a limit switch positioner means for controlling and measuring the depth of holes by a machine tool such as, for example, in an electric or spark discharge machining process referred to generally as an EDM process.

EDM machines are used to form holes of varied shapes in materials of poor machinability and to form cavities in steel dies. To attain high surface quality and accuracy, it is essential that small gaps or spaces be maintained between the cutting tool or cathode and the work piece or anode. The gaps are essential as they are filled with a dialectric hydrocarbon oil cooling medium which flushes away metal particles. The electrode cutting tool is advanced by a machine carriage, usually in the form of a vertically reciprocal ram member, by means of an electrical servo mechanism which controls and maintains the rate of feed and proper gap size. In this manner, cavities from a few 1000ths of an inch to two or three inches in width may be machined by this process. Although EDM machines have found remarkable success in the machine tool industry, it has been a particular problem to control the depth of holes or blind bores maintaining a desired gap between the electrode and the work.

It is an object of the present invention to provide an adjustable positive stop limit switch gauging or measuring apparatus which may be readily added to an existing machine.

Another object of the present invention is to provide a limit switch positioner apparatus wherein a cutting tool or a machine ram or the like may be automatically halted at the finish of its forming operation at an exact location relative to the work piece assuring the accurate formation of holes, cavities, etc.

A further object of the invention to provide a limit switch gauging positioner apparatus for an electric-discharge machine having an adjustable micrometer stop assuring that there is no physical contact between the electrode tool and the workpiece while providing high quality and accuracy.

SUMMARY OF THE INVENTION

According to the invention, an improved limit switch gauging positioner apparatus is provided for use in combination with a reciprocating ram or carriage for a machine, such as in electric-discharge machining and similar machining tools.

In the disclosed arrangement a stationary frame or head of a machine includes a reciprocal ram supporting a forming tool such as, for example, an EDM electrode cutting tool. A gauging rod is connected to the ram to enable a body member to slide thereon along the rod axis parallel with the path of travel of the ram. Suitable coupling means, such as a detent retractable plunger, is provided on the body to selectively engage a rod indent stop. The stops are spaced at graduated intervals which are correlatable with a stop surface on a housing member fixed to the machine head. Means are provided on the slidable body mounting a micrometer with its spindle extending in parallel offset relation with the axis of the gauging rod.

The fixed housing supports a microswitch having its closed actuator or push button urged in an extended position toward the micrometer spindle. Disposed intermediate the free end of the spindle and the microswitch actuator is an arm section of an L-shaped operating member pivotal on the housing having a positive stop finger section normal to the arm section. The switch operating arm section is gravitationally biased into arrested contact with the extended actuator normally maintaining the positive stop finger section in spaced relation with a stop surface of the housing, standing at a desired distance away from the end of the spindle.

Upon the operator presetting the micrometer spindle at a desired graduation, relative to a ram gauging rod stop, the machine tool may perform its machining operation by being fed along its path of travel relative to the work piece. As the machine tool reaches the end of its forming operation, the micrometer spindle contacts the switch operating member arm section pivoting the member and depressing the actuator de-energizing the ram drive source. Further pivoting of the operating member by the spindle causes the stop finger section to engage the stop surface of the housing assuring the accurate location of the ram at the spindle setting. The limit switch gauge position thus provides a positive stop to accurately locate the ram and obviate any over-feed of a forming tool caused by ram inertia, machine tolerances, inherent machine play, etc.

Other advantages and meritorious features of the disclosed invention will be more fully understood from the description of the preferred embodiments, the appended claims and drawings, description of which follows.

BRIEF DESCRIPTION OF THE DRAWINGS

FIG. 2 is an enlarged fragmentary elevational view of the limit switch gauging portion of the present invention;

FIG. 3 is a top elevational view partly in section taken substantially on the line 3—3 of FIG. 2;

FIG. 4 is a fragmentary side elevational view with parts broken away, showing the body member and gauging rod of the present invention; and FIG. 5 is an enlarged fragmentary vertical elevational view of the switch housing.

DETAILED DESCRIPTION OF THE INVENTION

Figure 1:
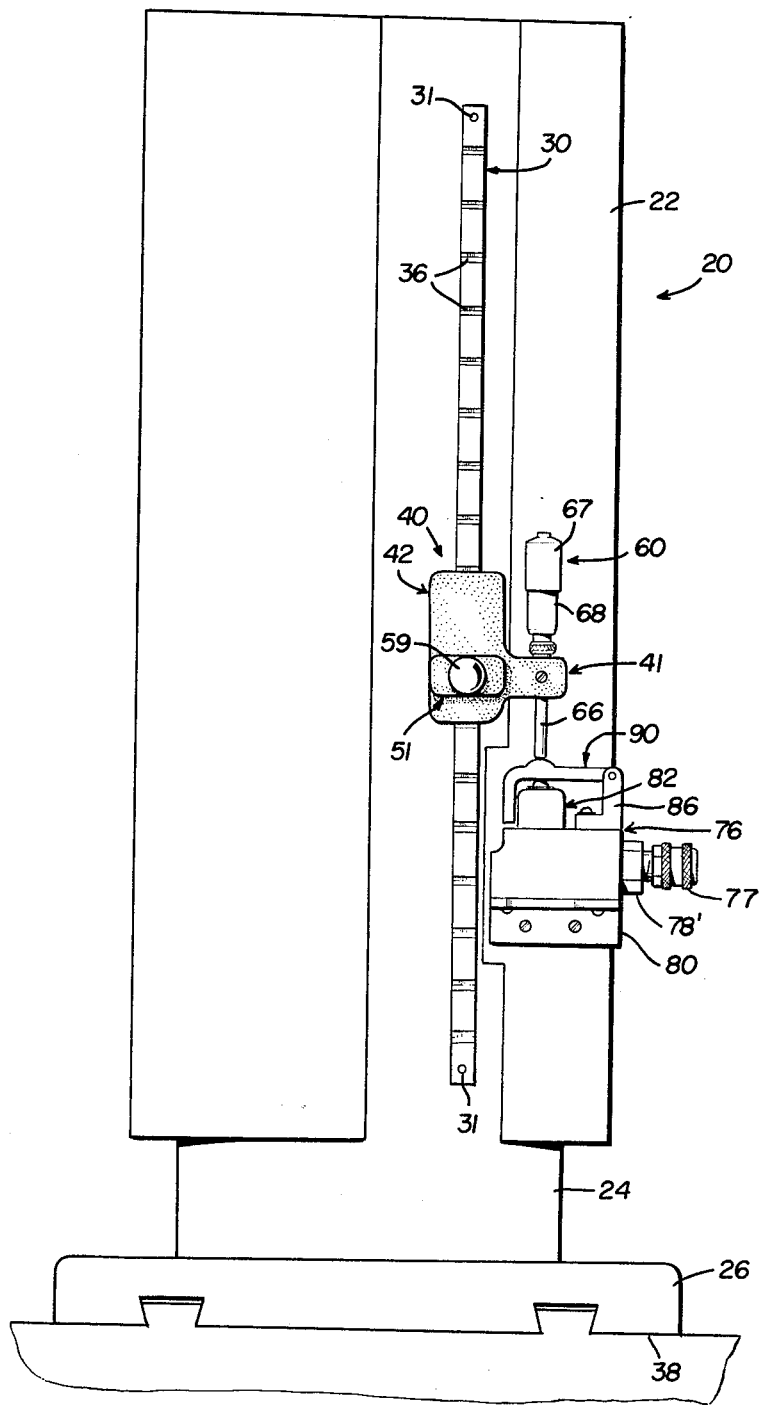
FIG. 1 is a fragmentary elevational view partially in schematic form of a machine tool incorporating the present invention.

Referring now to the drawings, there is illustrated in FIG. 1 a portion of a machine such as, for example, an electric discharge machine generally indicated at 20, having an upright stationary head or frame of which a fragment is shown at 22. A ram 24 such as a hydraulically operated double acting cylinder, is supported by the head 22 for vertical reciprocal movement relative to the head. The ram 24 has a tool holder or platen 26 mounted on its lower end for advancement along the ram vertical axis to feed a vertically disposed tool or cathode, not shown, toward an underlying workpiece or anode, also not shown. Suitable power supply means provide a source of power to both cathode and anode in a conventional manner during the electric discharge machine process. A servo system may be provided to control the hydraulic source of power and typically includes a servo mechanism which controls and maintains the rate of feed of the tool by means of a suitable electrical control circuit. Such systems are well-understood with one being shown, for example, in U.S. Pat. No. 3,662,142 issued May 9, 1972 to S. O. Olsson.

A gauging rod, generally indicated at 30, is mounted on the ram 24, such as by upper and lower pins 31, with the longitudinal axis of the rod located parallel with the ram vertical axis. As seen in FIG. 2 gauging rod 30 preferably has a square or rectangular cross-section defining a front face 32, side faces 33 and 34 and a rear face 35. The rod front face 32 has a plurality of engagement means in the form of V-shaped stops or indents 36 formed therein so as to be uniformly spaced at predetermined vertical intervals. In a disclosed form, each V-shaped indent defines at its root a linear datum indicia notch 37. The linear indicia notches 37 are horizontally disposed and vertically spaced at equal primary increments which, in the present embodiment are on exactly one inch centers. Further, each indicia notch 37 is located at a known or computed gauged distance relative to a reference face 38 of the platen 26.

As best seen in FIG. 2, a body member 40, including a micrometer mounting block portion 41, is slidably supported on the rod 30 by means of a guide block portion 42. The guide block portion 42 has a vertically disposed guide channel 43 formed therein having its open end in guide block rear face 44 enclosed by cap member 45 suitably secured thereto by machine bolts 46.

The guide block 42 has upper and lower spring biased ball bearings 47 each of which is urged into frictional engagement with its associated side face 33 and 34, respectively, by coil springs 48 retained by set screws 49 in threaded bores 50.

A plunger block portion 51 of the body 40 includes locking means in the form of a detent assembly generally indicated at 52. As best seen in FIG. 4, the detent assembly includes a cylindrical plunger 53 having a chisel or wedge-shaped tip 54 with inclined converging surfaces shaped to conform with the V-shaped indents 36. The plunger 53 is located in a through bore 55 having its axis normal to the rod face 32. The plunger 53 is reciprocally slidable in the bore 55 and is biased by coil spring 56 positioned around axial shaft 57 and retained therein by a cap member 58. The plunger shaft has an operating knob-like handle or grip 59 fixed on its outer end to allow the plunger to be manually retracted and uncoupled from a rod V-shaped indent by compressing the biasing spring 56.

With reference to FIG. 2, the body 40 has a measuring instrument, which in the disclosed form is a standard micrometer 60, mounted in block portion 41. The block portion 41 is provided with a vertically disposed through bore 61 having a set screw 62 positioned on an axis normal to the through bore axis to fixedly retain therein a cylindrical housing portion 63 of the micrometer. The micrometer 60, which measures accurately to one-thousandth of an inch, includes a sleeve 64 having 40 divisions or linear graduations (not shown). These divisions are equal to a distance of 1.000 inch and thus to the one inch increment between successive datum indicia notches 37.

A lock nut 65 is provided to retain micrometer spindle 66 at a fixed setting. The spindle 66 is reciprocally movable about its axis and may be vertically positioned by rotating its adjusting nut 67. The spindle is threadably mounted to reciprocate axially 0.025 inches on housing 63 when rotated one complete revolution by the adjusting nut 67. The micrometer has a conventional thimble 68 provided with 25 equal angular divisions about its circumference, each of these divisions representing 0.001 inches. In the position shown, the micrometer spindle has its end face 70 retracted to its upper zero limit position with the linear graduations on the sleeve 64 set at its zero graduation line 72 and with angular divisions 74 set at zero. Thus to set the spindle, the operator threadably moves or extends the spindle downwardly in a first direction to its gauge limit position, which in the disclosed embodiment is shown as one inch.

With reference to FIG. 1, a switch housing 80 is shown mounted on the support head 22. FIG. 2 shows the switch housing having an upper surface 81 supporting a microswitch 82 thereon. The switch actuator means includes a vertically reciprocal push-button actuator 83 extending through an aperture in the upper end of a flexible cap portion 84 of the microswitch formed of suitable elastomeric material. The actuator 83 is urged or resiliently biased in an upward or second opposite direction on its vertical axis 85 which is in substantial co-axial relation with the axis of the spindle 66.

A bracket 86 is positioned laterally outwardly from the microswitch on the housing upper surface 81 and is secured thereto by means of threaded fasteners 87. The upper portion of the bracket 86 is formed with trunions 88 for supporting therebetween an L-shaped switch operating member, generally indicated at 90. The operating member 90 is in the form of an L-shaped flange angle, preferably made of aluminum, having an arm section 92 disposed with its free end bore 91 (FIG. 4) aligned between the apertured trunions 88 and pivotally connected thereto by means of a through pin 94. The operating member has a finger section 96 extending normal to the arm section 92 providing a stop portion in the form of stop edge 97 operative for positively engaging a planar stop surface portion 98 of the housing 80. The operating member arm 92 provides a first surface portion 99 gravitationally biased into engagement with the actuator 83. That is, the switch actuator operating portion on surface 99 rests on the extended actuator 83 so as to be in continuous contact therewith. As seen in FIG. 2, the switch actuator 83 is biased in the second direction to normally maintain the L-shaped operating member 90 in its dashed-line position. In such position its arm 92 is angularly disposed to the axis 85 resulting in the stop edge 97 being spaced a defined axial distance from the housing stop surface 98.

In operation, upon axial movement of the micrometer spindle 66, resulting from a power source moving the ram 24 downwardly along its path of travel, the spindle end face 70 will contact an arcuately shaped anvil portion 100 of the arm section 92. Continued movement of the spindle causes the actuator 83 to be depressed opening of the microswitch 82 and de-energizing the ram power source by means of a suitable control circuit, not shown. The ram, however, will continue its downward travel a fractional distance as a result of its inertia, machine tolerances, inherent play, etc. Such "over-travel" of the ram, however slight, is undesirable in the forming operation wherein the location of the machine tool, such as an EDM electrode, relative to the work piece is critical.

As a result of the ram over-travel the micrometer spindle continues to pivot the operating member 90 downwardly, after opening of the microswitch, to its fall line position. The subsequent engagement of the stop edge 97 with the stop surface 98 provides a positive ram stop wherein the ram is accurately located in correlation with a predetermined micrometer spindle graduated setting.

Thus, with the spindle at its retracted zero limit position its end face 70 engages anvil portion 100 pivoting member 90 and pushing down actuator 83 until edge 97 is arrested by stop surface 98. This zero limit micrometer setting will accurately position a tool, supported on ram platen 26, to a correct depth of cut correlated to datum indicia notch 37b. The micrometer 60 enables the operator to provide an exact vertical feed setting between adjacent indicia notches at graduated 0.001 inch intervals to cover the 1 inch distance between the notches. Accuracy of the order of 0.001 to 0.002 inches for the depth of holes in a workpiece are obtainable, for example, in the disclosed form of the invention.

In FIG. 2, it will be noted that with the switch operating member 90 in its full line stop position an imaginary plane indicated by construction line 102, includes both the bottom operating surface 99 of the arm section 92 and the linear detent notch 37b. This coplanar relation exists when the micrometer spindle 66 is pre-set at its zero limit position wherein finger section step edge 97 positively engages stop surface 98. Thus, the relative positions of the guide rod 30 to the spindle zero limit position may be initially gauged and readily checked to insure exact lineal correlation between the rod indicia notches 37 and the zero limit setting of the micrometer spindle.

It is to be understood that the previously described embodiment is merely exemplary of the present invention and not intended to be limiting in any sense.

Having fully and completely described my invention, I now claim:

1. A limit switch gauging apparatus for a member reciprocal along a path of travel relative to a support wherein the member is driven by a drive source controlled by electrical circuit means; said apparatus comprising:
   a lineal distance gauging rod mounted on the member with the rod longitudinal axis parallel with the member path of travel, said rod having a plurality of indents incrementally spaced along its axis;
   a body slidably carried on said rod for movement along the rod axis including locking means by which said body is releasably coupled with a selected one of said indents;
   a micrometer on said body having a micrometer spindle adapted to be moved to a selected graduated setting on an axis parallel with said rod axis;
   a switch on said support including actuator means resiliently urged toward said spindle to an extended switch closed position opposite from a retracted switch open position;
   the arrangement characterized in that with said body locking means coupled to a selected one of said rod indents and said micrometer spindle set at a preselected graduation, the closing of the circuit means causing the member to be driven along its path of travel resulting in the end face of said spindle engaging said switch actuator means whereby said switch actuator means is moved to its switch open position opening the control circuit de-energizing the drive source.

2. The structure as set forth in claim 1, wherein:
   said actuator means including a switch actuator reciprocally movable substantially on said spindle axis;
   said actuator means further including an L-shaped operating member including an arm section and a finger section, said operating member being pivotally connected at the free end of said arm section to said support, said arm section defining a switch operating portion and said finger section defining a stop portion, said L-shaped operating member gravitationally biasing said arm section wherein said arm section switch operating portion rests on said switch actuator with said finger stop portion located at a defined distance above a stop surface on said support;
   the arrangement characterized in that with said body locking means coupled to a selected one of said rod indents and said micrometer spindle set at a preselected graduation, the closing of the circuit means causing the member to be driven along its path of travel resulting in the end face of said spindle engaging said arm section, whereby the spindle initially pivots said arm section causing said switch actuator to be moved to its switch open position opening the control circuit de-energizing the member drive source, and subsequent thereto said spindle further pivoting said finger section stop portion into positive engagement with said stop surface assuring the member being accurately located relative to the preselected graduated setting of said micrometer spindle.

3. A limit switch positioner gauging apparatus for a ram reciprocal along a path of travel relative to a ram support head with the ram being driven by a drive source controlled by electrical circuit means, said apparatus comprising:
   a lineal distance gauging rod mounted on the ram with a rod longitudinal axis parallel with the ram path of travel, said rod having a plurality of engagement means spaced along the rod axis at specific datum intervals;
   a body carried on said rod for movement along the rod axis, and means on said body by which said body is releasably coupled with a selected one of said engagement means;
   a measuring instrument on said body having a spindle incrementally positionable in a first direction from a zero limit position to a selected graduated setting on an axis parallel with said rod axis, correlative with the selected engagement means interval;
   switch support means fixed on the head supporting a microswitch electrically connected in the circuit means, said microswitch including a switch actuator reciprocally movable substantially parallel with said rod axis, said actuator resiliently urged in a second opposite direction to an extended switch closed position toward said spindle from a retracted switch open position;
   an operating member movably supported on said switch support means having a switch operating portion and a ram stop portion, means for biasing said operating member such that said switch operating portion rests on the extended switch actuator, and wherein said operating member stop portion is positioned in axially spaced relation relative to a stop on said switch support;

the arrangement characterized in that upon the ram being driven along its path of travel in said first direction resulting in said spindle engaging said operating member, whereby said spindle initially moves said operating member in said first direction causing said actuator to be moved to its retracted switch open position such that the circuit means de-energizes the ram drive source, and subsequent thereto said spindle further moving said operating member stop portion in said first direction into positive engagement with said support stop and accordingly accurately locating the ram with respect to said preset spindle.

4. The apparatus as set forth in claim 1, wherein:

each said rod engagement means in the form of a indent, and said body coupling means in the form of a detent assembly, said detent assembly including a plunger movable on an axis normal to said rod axis, sid plunger having a retracted position wherein said body is freely movable on said rod, and an extended position in which said plunger engages a selected one of said indents to releasably couple said body on said rod; and spring biasing means normally urging said plunger into its extended position into engagement with a selected one of the detents.

5. The apparatus as set forth in claim 4 wherein:

each said indent having a V-shape; and said plunger having a wedge-shaped tip portion adapted for complimentary engagement with a selected one of the V-shaped indents formed in said rod.

6. The apparatus as set forth in claim 3 wherein;

said operating member being pivotally supported on said switch support means with said switch actuator operating portion located intermediate said spindle and said switch actuator so as to be biased by gravity in said first direction.

7. The apparatus as set forth in claim 6 wherein:

said switch operating member in the form of an L-shaped angle member having an arm section disposed normal to a finger section;

said arm section defining said switch operating portion disposed intermediate said switch actuator and said spindle; and said finger section, defining said ram stop portion, disposed in a direction substantially parallel to said rod axis upon said operating member pivoted to its positive stop position.

8. The apparatus as set forth in claim 3, wherein:

each said rod engagement means defining a linear datum indicia notch disposed transversely to said rod axis;

said switch operating portion in the form of a flat surface defining an imaginary plane normal to said rod axis upon said operating member stop portion having been moved to its positive stop position;

the arrangement characterized in that the extension of said imaginary plane including a linear datum indicia notch with said spindle at its zero limit graduation setting enabling calibration of said instrument relative to a selected one of the rod engagement means.

9. The apparatus as set forth in claim 7 wherein:

said L-shaped angle member having its arm section free end pivotally supported by bracket means located on a mounting surface of said switch support means, such that said arm section switch operating portion in the form of a flat surface located in opposed substantially parallel relation with said switch support mounting surface upon said operating member having been pivoted to its positive stop engagement position;

said rod engagement means in the form of V-shaped indent formed in said rod, each said V-shaped indent defining a linear datum indicia notch;

the arrangement characterized in that said arm section switch operating surface defining an imaginary plane the extension of which includes a linear datum indicia notch with said spindle at its zero limit graduation setting to calibrate said measuring instrument relative to a selected one of the rod indicia notches.

10. A position index limit switch gauging apparatus for an electric-discharge machine or similar machine tool including a ram reciprocal along a vertical path of travel relative to a ram support head driven by a drive source controlled by electrical circuit means; said apparatus comprising:

a lineal distance gauging rod mounted on the ram with the rod longitudinal axis parallel with the ram path of travel, said rod having a plurality of V-shaped indents incrementally spaced along its axis;

a body slidably carried on said rod for movement along the rod axis, and a reciprocal plunger on said body by which said body is releasably coupled with a selected one of said indents, said plunger having a wedge-shaped tip portion for complimentary engagement with a selected one of the V-shaped indents;

a micrometer on said body having a micrometer spindle adapted to be moved to a selected graduated setting on an axis parallel with said rod axis;

a switch support housing fixed on the head supporting a microswitch on its upper mounting surface, said switch including an actuator reciprocally movable substantially on said spindle axis and resiliently urged upwardly toward said spindle in its extended switch closed position opposite from its retracted switch open position;

an L-shaped operating member including an arm section and a finger section, said operating member being pivotally connected at the free end of said arm section to said housing, said arm section having a bottom surface defining a switch operating portion and said finger section having a lower edge defining a stop portion, said L-shaped operating member gravitationally biasing said arm section downwardly wherein said arm section bottom surface rests on said switch actuator with said finger stop portion located at a defined distance above a stop surface on said housing;

the arrangement characterized in that with said body plunger coupled to a selected one of said rod indents and said micrometer spindle set at a preselected graduation, the closing of the circuit means causing the ram to be driven downwardly along its path of travel resulting in the end face of said spindle engaging said arm section, whereby the spindle initially pivots said arm section causing said switch actuator to be retracted opening the control circuit de-energizing the ram drive source, and subsequent thereto said spindle further pivoting said finger section stop portion into positive engagement with said housing stop surface assuring the ram being accurately located relative to the preselected graduated setting of said micrometer spindle.

* * * * *